Patented June 2, 1931

1,807,694

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF NITROGENOUS VAT DYESTUFFS

No Drawing. Application filed October 22, 1928, Serial No. 314,312, and in Germany November 17, 1927.

We have found that dyestuffs dyeing gray to black very fast shades are readily obtained in a manner which is easily carried out in practice, by treating nitrodibenzanthrone, nitro-iso-dibenzanthrone, or their derivatives, with an amount of a suitable reducing agent, which is insufficient for the complete conversion of the nitro groups present into amino groups, suitable solvents or diluents being employed, if desired, and by condensing the resulting mixtures of nitro- and amino-dibenzanthrones, preferably in the presence of solvents or diluents of high boiling point, and, if desired, with the addition of agents capable of binding acids or catalysts, or both. As diluents of high boiling point nitrobenzene, nitrotoluene, trichlorbenzene, naphthalene and the like may be employed. Sodium acetate, sodium carbonate or the corresponding potassium or calcium salts or magnesium oxid may be used as acid-binding agents, and as condensing catalysts copper, mercury or their salts and oxids, or aluminium may be mentioned.

In order to simplify the treatment of the reaction mixture, use is preferably made of a reducing agent, which, on the one hand, is convertible into readily soluble or gaseous products and on the other hand does not affect the condensation to the final dyestuff, because when so working a troublesome treatment or purification of the reaction product may be dispensed with. Reducing agents of the said kind are for instance hydrazine hydrate or sulfate, hydroxylamine, phenylhydrazine and the like.

If the reduction of the nitrodibenzanthrones be conducted in such a manner that the nitro- or the amino-compounds predominate, instead of mixtures being formed, which contain equivalent amounts of nitro- and amino-dibenzanthrones capable of complete mutual condensation, then, on the completion of the main reaction, that is to say after, or also simultaneously with, condensation of the nitrodibenzanthrones with the aminodibenzanthrones formed, the remainders of the not condensed nitro- or amino-dibenzanthrones may still be treated, in case a nitrodibenzanthrone is in excess, with such nitrogenous compounds as possess at least one reactive hydrogen atom attached to the nitrogen, for instance primary or secondary amines, carbazols and the like, or in case an aminodibenzanthrone is in excess with other negatively-substituted aromatic compounds.

The dyestuffs so produced, of which excellent yields are obtained, possess excellent tinctorial and fastness properties. Thus, for example, the dyestuff from nitrodibenzanthrone, prepared according to U. S. Patent No. 1,513,851, reduced to the extent of one half with hydrazine hydrate and further condensed with the resulting aminodibenzanthrone in the manner described, dyes the vegetable fibre from a blue vat gray to black shades and corresponds to the formula

in which R stands for a dibenzanthronyl radicle.

The following examples will further illustrate the nature of the said invention, which however is not limited thereto. The parts are by weight.

Example 1

500 parts of nitrodibenzanthrone, prepared, for example, according to the U. S. Patent No. 1,513,851, in 10000 parts of nitrobenzene are slowly heated to boiling and stirred with 85 parts of 100 per cent hydrazine hydrate, boiling being continued as long as ammonia continues to escape. 10 parts of cupric oxid and 280 parts of potassium carbonate are then added and boiling is continued, while intensely stirring, until the formation of the dyestuff is complete, the latter being then filtered by suction, washed with dilute hydrochloric acid and water, and dried. The dyestuff so produced, of which an excellent yield is obtained, is a black powder which gives very fast gray to black dyeings on cotton from a blue alkaline hydrosulfite vat. The solution of the dyestuff in concentrated sulfuric acid is violet in color.

Example 2

100 parts of nitrodibenzanthrone, prepared, for example, according to the said

U. S. Patent No. 1,513,851, in 10000 parts of nitrobenzene are stirred and slowly heated to boiling with 24 parts of hydrazine hydrate. When the evolution of ammonia has ceased, 40 parts of sodium acetate and 1 part of cupric oxid are added, and boiling is continued, until no more unaltered nitrodibenzanthrone can be detected. 25 parts of 1.5-dichloranthraquinone are added, boiling and stirring are continued, until the formation of the dyestuff is complete, the latter being then filtered by suction and treated as described in Example 1. The dyestuff which is obtained in the form of a black powder, dissolves to a violet solution in concentrated sulfuric acid and gives blue gray to black blue tinged dyeings, of excellent fastness, on cotton from a blue vat.

If the 1.5-dichloranthraquinone be replaced by other negatively-substituted compounds, such as halogenbenzanthrones, halogenacridones, halogenanthanthrones, cyanuric chlorid, chloranile and the like dyestuffs with similar properties are obtained..

What we claim is:

1. A process of producing new vat dyestuffs, which comprises reducing a nitrodibenzanthrone with an amount of a reducing agent insufficient for complete reduction and condensing the resulting mixture of nitro- and amino-dibenzanthrone.

2. A process of producing new vat dyestuffs, which comprises reducing a nitrodibenzanthrone with an amount of a reducing agent insufficient for complete reduction and condensing the resulting mixture of nitro- and amino-dibenzanthrone, the reduction and the condensation being carried out in a diluting medium of a high boiling point.

3. A process of producing new vat dyestuffs, which comprises reducing a nitrodibenzanthrone with an amount of a reducing agent insufficient for complete reduction and condensing the resulting mixture of nitro- and amino-dibenzanthrone in the presence of an acid-fixing agent, the reduction and the condensation being carried out in a diluting medium of a high boiling point.

4. A process of producing new vat dyestuffs, which comprises reducing a nitrodibenzanthrone with an amount of a reducing agent insufficient for complete reduction and condensing the resulting mixture of nitro- and amino-dibenzanthrone in the presence of an acid-fixing agent and a condensing catalyst, the reduction and the condensation being carried out in a diluting medium of a high boiling point.

5. A process of producing new vat dyestuffs, which comprises reducing a nitrodibenzanthrone with an amount of a reducing derivative of ammonia insufficient for complete reduction and condensing the resulting mixture of nitro- and amino-dibenzanthrone.

6. A process of producing new vat dyestuffs, which comprises reducing a nitrodibenzanthrone with an amount of a reducing agent capable of reducing more than half of the nitro-dibenzanthrone but insufficient for complete reduction and condensing the resulting mixture of nitro- and aminodibenzanthrone, together with an aromatic compound containing a negative substituent.

7. A process of producing new vat dyestuffs, which comprises reducing a nitrodibenzanthrone with an amount of a reducing agent capable of reducing more than half of the nitrodibenzanthrone but insufficient for complete reduction and condensing the resulting mixture of nitro- and aminodibenzanthrone, together with a halogenated anthraquinone.

8. As new article of manufacture the vat dyestuff corresponding to the formula

in which R stands for dibenzanthronyl radicle, a black powder, dyeing cotton from a blue vat gray to black shades and dissolving to a violet solution in concentrated sulfuric acid.

In testimony whereof we have hereunto set our hands.

MAX ALBERT KUNZ.
KARL KOEBERLE.